UNITED STATES PATENT OFFICE.

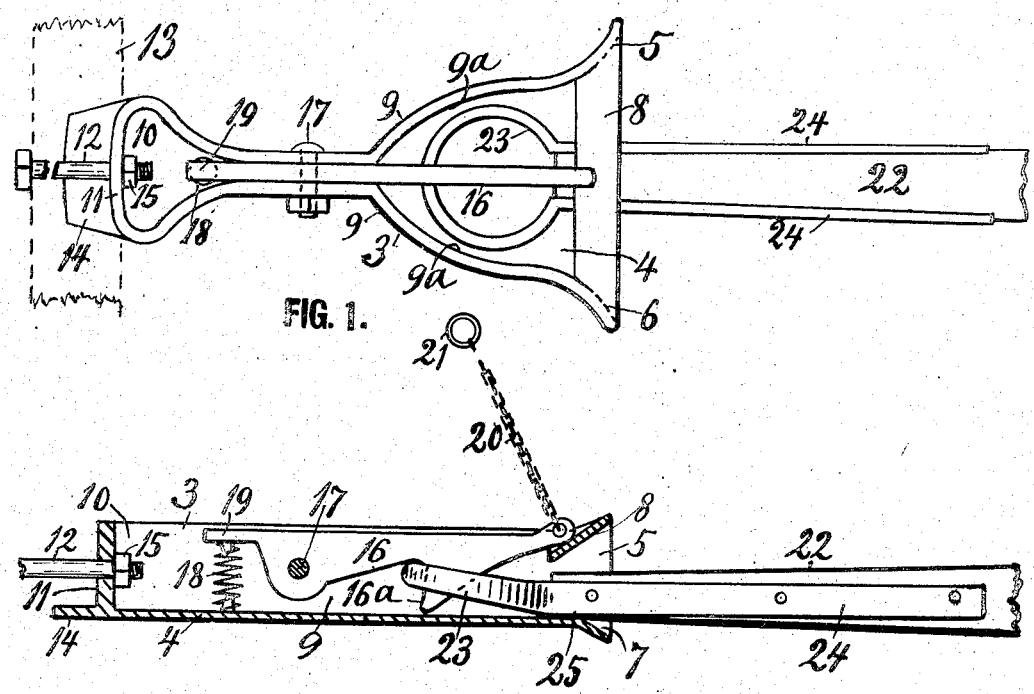

LARS EVENSEN, OF RENVILLE, MINNESOTA.

VEHICLE-COUPLING.

No. 827,431.      Specification of Letters Patent.      Patented July 31, 1906.

Application filed March 19, 1906. Serial No. 306,802.

*To all whom it may concern:*

Be it known that I, LARS EVENSEN, a citizen of the United States, residing at Renville, in the county of Renville and State of Minnesota, have invented certain new and useful Improvements in Vehicle-Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in vehicle-couplings; and the object is to provide a cheap but efficient means for coupling together any two vehicles, but especially for coupling readily the pole of a portable threshing-machine to a traction-engine. This object I attain by the novel construction and combination of parts illustrated in the accompanying drawings, in which—

Figure 1 is a top or plan view of my improved coupling as applied between a traction-engine and a pole of a threshing-machine or other vehicle. Fig. 2 is a longitudinal vertical substantially central sectional view of the coupling shown with the pole in place, but not intersected.

Referring to the drawings by reference-numerals, 3 designates the body or shell of the coupling. It is formed of a thin bottom 4 and flaring lips 5, 6, 7, and 8, of which 8 is the upper one and consists of a flat transverse bar inclined downwardly with its rear edge.

Extending rearwardly from said lips are the side ribs 9, which, with their rear ends, unite into a loop or box 10, through the rear wall 11 of which there is a hole for a bolt 12, extending from the dead-wood 13 or any other suitable part of the traction-engine, while the flat tailpiece 14 bears in under the timber and the nut 15 on the bolt holds the coupling detachably to the engine. The side ribs are near the middle brought together to form cheeks between which the coupling-hook 16 is pivoted on the bolt 17. Said hook is constantly pressed downward by a spring 18 under its near rear arm or tail 19. When it is to be raised, the operator on the engine pulls the hook upward by the chain 20 and ring 21, which is within convenient reach upon the engine.

22 is the pole of the threshing-machine or other vehicle to be coupled to the engine. The hole is beyond its front end provided with a horizontal forwardly-elevated ring or eye 23, having arms 24 secured upon the sides of the pole.

In the act of coupling, the eye or loop 23 is simply held in a position to strike the funnel or mouth of the shell, and as the engine is reversed the shell receives the loop and by its converging sides $9^a$ guides it to such a central position that the point $16^a$ of the hook is bound to engage it, and as the loop is curved upward at the front end and rests on the bottom of the shell at the point 25 the hook gets a very good hold, so it cannot possibly become disengaged accidentally.

While the coupling may be forged and put together in various ways, I prefer to cast from malleable iron or similar material the entire shell, with its bottom 4, side ribs 9, rear rib 11, and mouth 5 6 7 8, all in one piece. Also the dog or hook 16 and the loop 23 24 are each made integral of suitable material.

Having thus described my invention, what I claim as new, and desire to secure by Letters Patent, is—

1. In a coupling of the class described, the combination with an elongated shell securable to a traction-engine and comprising a flaring mouth, a bottom and vertical side and rear ribs formed integral, said side ribs converging from the mouth of the shell to near the middle of it, a downwardly-spring-pressed coupling-hook pivoted between said side ribs, and a horizontally-disposed eye or loop securable to the end of a pole and adapted to be guided into engagement with the coupling-hook by the converging side ribs of the shell; said eye or loop being with its front end inclined upwardly from the bottom of the shell for the purpose set forth.

2. In a coupling of the class described, the combination with a shell having at one end a flaring mouth and converging sides extending rearwardly therefrom, and at the other end a vertical perforated rib adapted to be bolted to a traction-engine and in the rear of said rib a horizontal rib, and a downwardly-spring-pressed coupling-hook pivoted in the shell and adapted to engage an eye on the end of a pole of a vehicle.

3. In a coupling of the class described, the combination with an elongeted shell securable to a traction-engine and comprising a flaring mouth, a bottom, vertical side and rear ribs formed integral, said side ribs converging from the mouth of the shell to near the middle of it, a downwardly-spring-pressed coupling-hook pivoted between said side ribs, a horizontally-disposed eye or loop securable to the end of a pole and adapted to be guided into engagement with the coupling-hook by the converging side ribs of the shell, and suitable means extending from said coupling-hook within convenient reach of the driver on the engine, whereby the hook may be disengaged from the eye.

In testimony whereof I affix my signature in presence of two witnesses.

LARS EVENSEN.

Witnesses:
 A. U. BENNETT,
 A. H. NORTON.